United States Patent
Assink et al.

[19]

[11] Patent Number: 6,093,277
[45] Date of Patent: Jul. 25, 2000

[54] HOT STAKING MACHINE

[75] Inventors: Kenneth Assink, Holland; Mark J. Feenstra, Zeeland; Gerald L. Boyer, Jr., Grand Rapids, all of Mich.

[73] Assignee: J. R. Automation Technologies, Inc., Holland, Mich.

[21] Appl. No.: 08/292,846

[22] Filed: Aug. 19, 1994

Related U.S. Application Data

[60] Continuation of application No. 07/696,837, May 7, 1991, abandoned, which is a division of application No. 07/529,213, May 25, 1990, Pat. No. 5,018,957.

[51] Int. Cl.$^7$ .............................. B23P 11/00; B29C 65/00
[52] U.S. Cl. ..................... 156/292; 29/243.53; 29/509; 264/249; 156/309.6
[58] Field of Search .................. 156/292, 497, 156/293, 498, 91, 303.1, 308.4, 309.6, 320, 82, 196, 282; 264/249; 29/509, 243.53; 425/384

[56] References Cited

U.S. PATENT DOCUMENTS

| | | | |
|---|---|---|---|
| 551,079 | 12/1895 | Force et al. | 264/249 |
| 1,200,992 | 10/1916 | Searles | 264/249 |
| 1,370,690 | 3/1921 | Jacobs | 112/260 |
| 2,634,012 | 4/1953 | Copeman | 215/327 |
| 2,689,400 | 9/1954 | Mirando | 30/164 |
| 2,705,346 | 4/1955 | Schlabach et al. | 264/249 |
| 2,705,522 | 4/1955 | Kamborian | 156/216 |
| 2,739,360 | 3/1956 | Voss | 156/497 |
| 2,751,963 | 6/1956 | Valentine | 156/484 |
| 2,985,222 | 5/1961 | Marty et al. | 474/252 |
| 3,308,225 | 3/1967 | Wells | 264/249 |
| 3,325,329 | 6/1967 | Bolesky | 156/216 |
| 3,419,297 | 12/1968 | Diepenhorst et al. | 403/28 |
| 3,438,108 | 4/1969 | Nash | 29/91.5 |
| 3,439,379 | 4/1969 | Graf | 425/508 |
| 3,489,829 | 1/1970 | Lipfert | 264/249 X |
| 3,551,239 | 12/1970 | Newton | 156/213 |
| 3,586,566 | 6/1971 | Van Vleet | 156/213 |
| 4,174,988 | 11/1979 | Moore | 156/213 |
| 4,615,668 | 10/1986 | Matsuda | 425/145 |
| 4,619,725 | 10/1986 | Muraishi | 156/182 |
| 4,633,559 | 1/1987 | Loren | 29/243.5 |
| 4,755,120 | 7/1988 | Onnenberg | 425/125 |
| 4,763,397 | 8/1988 | Tsukayama et al. | 29/509 |
| 4,767,298 | 8/1988 | Bocchicchio et al. | 264/249 X |
| 4,784,591 | 11/1988 | Ackermann | 425/116 |
| 4,793,784 | 12/1988 | Belleville | 425/111 |
| 4,793,793 | 12/1988 | Swenson | 425/503 |
| 4,818,331 | 4/1989 | Shimoda | 156/485 |

FOREIGN PATENT DOCUMENTS

| | | |
|---|---|---|
| 45177 | 4/1976 | Japan . |
| 25976 | 10/1978 | Japan . |
| 80421 | 7/1981 | Japan . |

*Primary Examiner*—Francis J. Lorin
*Attorney, Agent, or Firm*—Price, Heneveld, Cooper, DeWitt & Litton

[57] ABSTRACT

An assembly of air heaters and reciprocally movable air driven staking tools is provided for use in the assembly of pieces using thermally softenable and pressure deformable studs. The air heaters and air driven staking tools are assembled in a supporting structure through which air is circulated to cool the staking tools to limit adhesion of hot softened material to the working face of each staking tool. The air heaters and air driven staking tools are individually selectable and controllable to meet the requirement of each workpiece to be hot staked. The method of operating the hot staking assembly is also disclosed.

4 Claims, 3 Drawing Sheets

HOT STAKING MACHINE

This is a continuation of application Ser. No. 07/696,837, filed on May 7, 1991, now abandoned, which is a division of application Ser. No. 07/529,213, filed on May 25, 1990, now U.S. Pat. No. 5,018,957.

BACKGROUND OF THE INVENTION

The use of a hot staking technique for joining pieces of material together is well known in the art. In the hot staking process, a first piece is formed with a plurality of spaced apertures along the edge to which a second piece of plastic is to be joined. The second piece has a plurality of spaced studs which project from the surface of the piece and in assembly are inserted in the apertures in the first piece. Each individual stud is then heated and shaped by a suitable metal tool to form a rivet-like end on the stud to lock the two pieces together. While this sounds like a relatively simple process to carry out, great care must be exercised in the heating of the stud in order to properly form a strong joint between the two parts. Too much heat tends to cause the stud to begin to flow and shaping the stud will not remove enough of the heat quickly enough to cause the stud to lock the parts together, resulting in a loose joint. If the stud is not heated enough before being shaped, the stud will tend to develop stress and the plastic base will show stress weakness as discoloration and multiple rings surrounding the stud.

The method of applying heat to the stud is also important. In the past, it has been common for the shaping tool to be heated and then applied to the stud where it transfers heat to the stud, softening the stud as the stud is being shaped. This technique results in stress in the stud as the stud is not heated properly before pressure is applied and also the heated staking tool tends to soften the plastic resulting in plastic being withdrawn from the shaped stud by the tool. When the shaping tool is withdrawn, thin hair-like strands of plastic can be drawn away from the stud which, in a proper operation, should be cleaned from the staking tool before the next staking operation is carried out or else a very poor quality product will result.

In another technique, heat is applied directly to the stud in the form of hot air and after the stud is warm, a first tool in the form of a clamp comes down camming the heat duct out of the way before a second shaping tool comes down to stake or shape the softened stud. The overall result of this technique is a very complex machine.

Through the experimentation leading to the development of the present invention, the inventors determined that the key to the hot staking process is the proper preparation of the stud before shaping and the proper application of pressure to the stud by a cool staking tool. If the stud is heated to just below the temperature where it will begin to undergo flow, and if this heating process is carried out very quickly, then the staking tool will be able to shape the part without inducing stress into the part. and/or the underlying plastic material being joined. The inventors also found that pressure cannot be traded off for heat. If an attempt is made to speed up the process by shortening the heating time and increasing the pressure, a very poor joint is formed which is subject to stress fatigue and discoloration in the parts being joined together.

SUMMARY OF THE INVENTION

In accordance with the present invention, a hot staking assembly has been developed which can be used in many different machines with the entire assembly being transportable as a unit between machine frames. The hot staking assembly can also be shaped to conform to the particular configuration of the workpieces being joined together and can also be controlled so that in a multiple heater assembly equipped with multiple staking tools, selected heaters and tools can be used for various parts so that, in effect, the hot staking assembly becomes a multi-function tool.

In the hot staking assembly, first and second support plates are aligned and spaced from each other. In between the support plates are mounted a plurality of air heaters and a similar plurality of reciprocally removable extensible cylinders. Each extensible cylinder contains a staking tool which, in its extended position, defines a working point for the hot staking assembly. Each of the air heaters has a vertically inclined tubular vent for directing a jet of heated air to the working point defined by the extended staking tool.

In operation, the hot staking assembly is aligned with the orientation of the parts and the air heaters are warmed. After the assembly is up to temperature a jet of air for a predetermined time is passed through each air heater to heat the stud at the work location, as defined above. The heated air is then stopped and the staking tool is extended to shape the stud into the desired head configuration after which it is immediately withdrawn. In the preferred configuration the air heaters and extensible cylinders are fastened to separate support plates which define a first and second surface. Each air heater is insulated along its full length to increase the efficiency of the heater and to lower the amount of heat radiated by the heater. Each heater is also carefully insulated from the support plates to reduce the amount of conduction heating. The first and second plates are then preferably joined together by sheet metal third and fourth plates forming a plenum or conduit through which air can be blown to reduce the overall temperature of the hot staking assembly. By the use of this assembly, great care is taken to reduce heat from all sources but the inclined vent tube exiting the air heater. Heat is then focused on the stud at the working point for a precisely determined period of time and the stud is shaped at a selected pressure to properly carry out the staking process to form joints of maximum strength, with little or no signs of stress and with no trailing of hot plastic by hot staking tools.

DETAILED DESCRIPTION OF THE PREFERRED EMBODIMENTS

Figure 1:
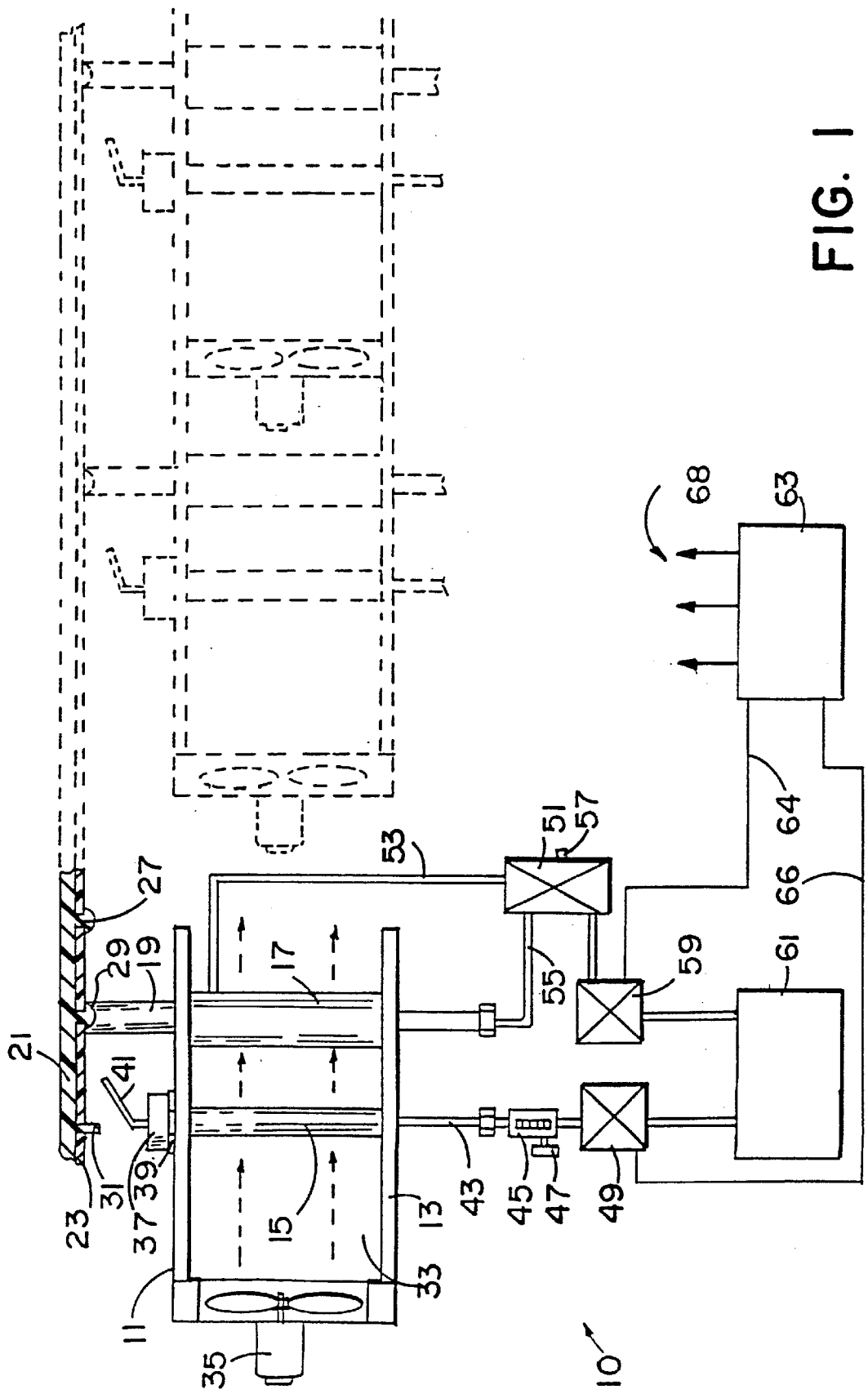
FIG. 1 is a schematic view of one unit of the hot staking assembly and showing in phantom how multiple units can be joined into a continuous assembly.

Referring to FIG. 1, a single unit of the hot staking assembly is shown and indicated generally by the number 10. A typical hot staking assembly can have any number of repetitions of the basic unit 10 in any desired configuration to fit the needs of the parts being hot staked together. Multiples of the basic unit 10 can be put into a square or rectangular configuration for the assembly of large pieces. For a long part like an automobile quarter panel, multiples of the basic unit can be placed in line so that the entire assembly can be hot staked in one operation. The staking units can be mounted in an arcuate configuration, for example, in joining a fender liner inside an automobile fender. In operation, the basic unit can be in any orientation depending on the configuration of the workpieces to be joined together. As shown in FIG. 1, the hot staking unit has an upper plate 11 and a lower plate 13 between which are supported an air heater unit 15 and an extensible cylinder 17 having a reciprocally movable staking tool 19 vertically movable therein. As shown in FIG. 1, the staking tool 19 is shaping a stud to join the two pieces of material 21 and 23 together. In FIG. 1 a finished stud is shown at 27, a stud being shaped is shown at 29 and a stud yet to be heated is shown at 31. The plates 11 and 13 form the top and bottom surfaces of an air plenum. Sheet metal plates 33, only a portion of one of which is shown, are fastened to the edges of plates 11 and 13 to form sides for the plenum. Also, the plates 11 and 13 have round stock ¾-inch diameter spacers (not shown) holding them together. An electric fan 35 blows air through the plenum to reduce the amount of heat therein so that the staking tool 19 will be relatively cool. It appears that the key to the operation of the hot staking machine is the treatment of the stud. Great care is taken in the machine to be sure that excess heat is removed or limited in the machine so that a precise control can be made of the amount of heat applied to the deformable stud. The stud is heated by a direct blast of hot air at a temperature of approximately 550° to 600° F. for approximately 3 to 6 seconds. The length of time is dependent on the size of the stud with the larger studs requiring more heat. The amount of heat applied to the stud is sufficient so that the stud can easily retain its shape while, at the same time, being easily deformable by the staking tool. The stud is heated just short of the fluid temperature where gravitational forces would tend to deform the stud.

The heater 15 is a tubular heater employing an electrical resistance element. The heater is approximately 6 inches long and ½-inch in diameter. The preferred heaters for use in the hot staking assembly can be obtained from J. R. Automation Technologies of Halland, Mich. Each heater generates approximately 400 watts. A heavy ceramic layer of insulation surrounds the heater to confine the heat to the tube through which the air passes. A manifold 37 is connected to the end of the heater. The manifold is preferably made of steel which is given a black oxide coating. The manifold 37 is insulated from the plate 11 by a layer of insulation 39 to limit conduction heating of the plate. The preferred insulation is a material called Micarda which is a phenolic insulation with 40% glass filler. This material has been found to be particularly useful in limiting the flow of heat to the plate 11. A steel tube 41 extends from the manifold 37 and has a vertically inclined portion to direct the jet of heated air immediately onto the stud to be heated. Each air heater 15 is coupled by a flexible tubing 43 to a flowmeter 45 which is used to adjust the flow of air through the air heater. The air flow can be tailored for the particular size stud being heated. In most applications, the preferred air flow is approximately 80 cubic feet per hour or 1.3 cubic feet per minute. A valve 47 associated with the flowmeter can be used to control the flow of air to the heater tube. An -electrically operated valve 49 is used to precisely time the flow of air through the air heater.

The extensible cylinder 17 is preferably pneumatic and approximately 6 inches in length and 1 inch in diameter, having a rolled bright stainless steel shell to limit the heating of the cylinder. The extensible staking tool 19 is preferably made of steel drill rod which is oil hardened and which is shaped at the end or working face to the config- uration desired for the finished staked plastic stud. Like the air heater 15, the pneumatic cylinder is connected to a control valve 51 by flexible tubing 53 and 55. The vent 57 for the pneumatic cylinder projects from the side of the valve 51. The valve 51 is preferably electrically controlled to control the operation of the extensible cylinder 17. Another valve 59 is connected in series with the valve 51 and is used for individual adjustment of the pressure applied to the extensible cylinder 17. An air compressor and ballast tank 61 is provided to supply the air for both the air heater 15 and the extensible cylinder 17.

As can be seen from the description of heat staking assembly 10, each air heater is individually connected to a source of air through flexible tubing and the volume of air passing through the air heater is individually adjusted. In a similar manner, each extensible cylinder 17 is connected in the hot staking assembly by flexible tubing and has an individual pressure control for the hot staking tool. Since the units are connected by flexible tubing and are all individually controllable, multiples of the units can be assembled, as shown schematically in FIG. 1, with the air control valves 49 and 59 being selectably controllable by a controller 63 over lines 64 and 66. The controller 63 can have a bank of switches, or even a programmed device which would actuate the particular valves in the pattern desired. Additional control lines 68 are shown for controlling the other units in the hot staking assembly.

Figure 2:
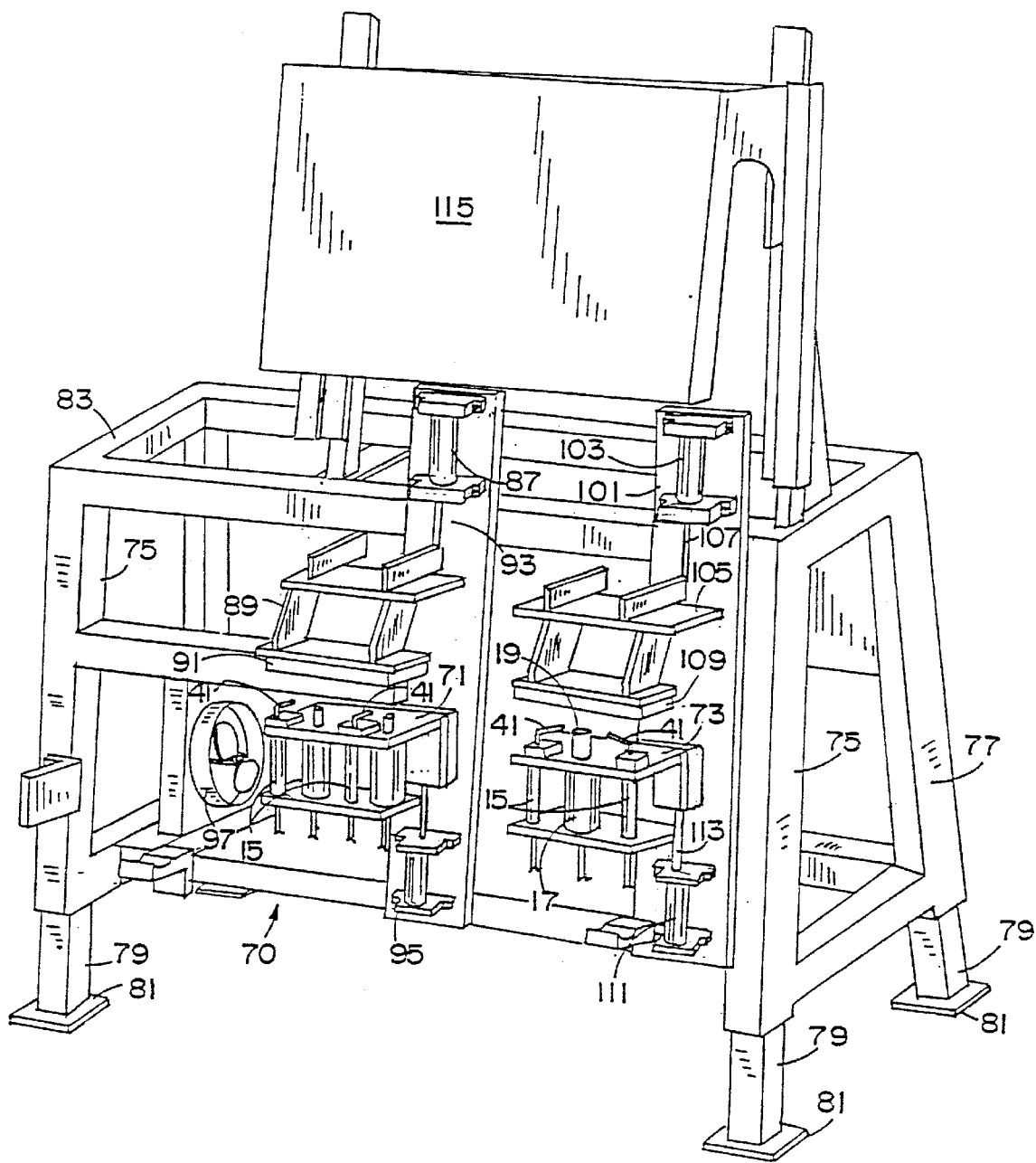
FIG. 2 is a view of two hot staking assemblies mounted in a hot staking machine.

As mentioned above, the hot staking assembly can be incorporated into many different types of machine frames. As shown in FIG. 2, a machine indicated generally by the number 70 is shown having two hot staking assemblies 71 and 73. The machine has a substantially A-shaped frame having inclined upstanding legs 75 and 77, which are mounted upon telescoping frame members 79, which have floor contacting feet 81. The top of the frame is closed by a rectangular tubular frame member 83 which completes the frame. Supported on the sloping front of the A-shaped frame is a movable tool assembly 85 which has a pneumatic cylinder 87 for moving a frame 89 vertically relative to the hot staking assembly 71. On the bottom of the frame assembly 89 is a nest 91 which comprises a block of non-marring plastic material which can hold the workpieces to be hot staked in position above the hot staking assembly 71. The frame 89 can be moved vertically by the pneumatic cylinder 87 and the connecting rod 93. A second pneumatic cylinder 95 is mounted near the bottom of the frame 85 and is connected to the hot staking assembly 71 for those situations where it is preferred to move the hot staking assembly to the parts being assembled rather than moving the parts to the hot staking assembly. A fan 97 is used to remove excess heat from the interior of the hot staking assembly so that the primary source of heat is the vent tube 41 from each air heater 15.

A second single unit hot staking assembly 73 is mounted on a support 101. An air cylinder 103 mounted on frame 101 is used to move a frame 105 through the movement of the connecting rod 107 into and out of the pneumatic cylinder 103. A nest 109 is mounted on the face of the frame 105 for supporting a workpiece in position relative to the hot staking assembly 73. The hot staking assembly 73 is intended to hot stake a single large stud and for this purpose has two air heaters 15, having vent tubes 41 directed to the work position above the face of the staking tool 19 which operates in pneumatic cylinder 17. Since a large stud is being worked on, more heat is required to raise the temperature of the stud to the softening temperature and, for this purpose, two individual air heaters are used. A pneumatic cylinder 111 is also attached to the support 101 and is connected to the hot staking assembly 73 by a connecting rod 113 so that, in the operation of the machine, a decision can be made as to whether the nest 109 and workpiece would be brought to the hot staking machine or whether the hot staking machine 73 would be raised to the workpiece. For simplicity of illustration of the machine 70, no workpiece is shown in position. The machine 70 is also equipped with a safety shield 115 which is shown in the raised position. When in use, the shield 115 is lowered to cover the front of the machine.

Figure 3:
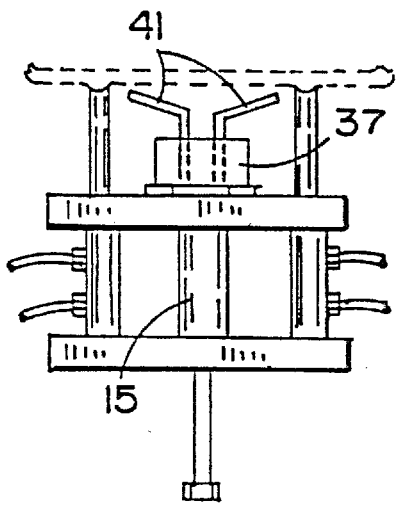
FIG. 3 is a modification of the hot staking assembly where one heater is used to heat two studs.
Figure 4:
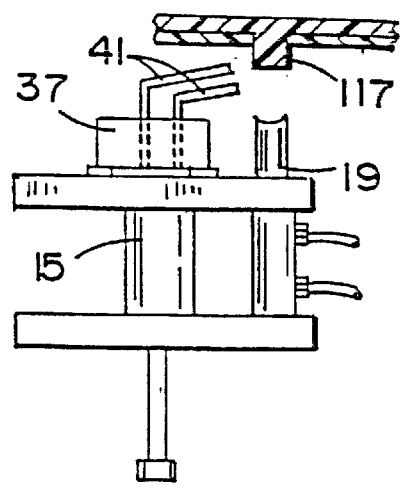
FIG. 4 is another modification of the assembly where a single heater has two exit vents for increasing the amount of heat applied to a large stud.

As mentioned previously, it is very important in the operation of the hot staking machine that the stud to be shaped be heated to the proper temperature. Referring to FIGS. 3 and 4, when small studs are to be shaped, a single air heater 15 can have a manifold 37 with two or more vents 41 for impinging heated air on small studs. In FIG. 4, a large stud 117 is shown in position to be heated and, because of the size of the stud, a manifold 37 on the air heater 15 has two output vents 41 directed at the stud 117. The staking tool 19 is enlarged and shaped to handle the size of stud 117.

Figure 5:
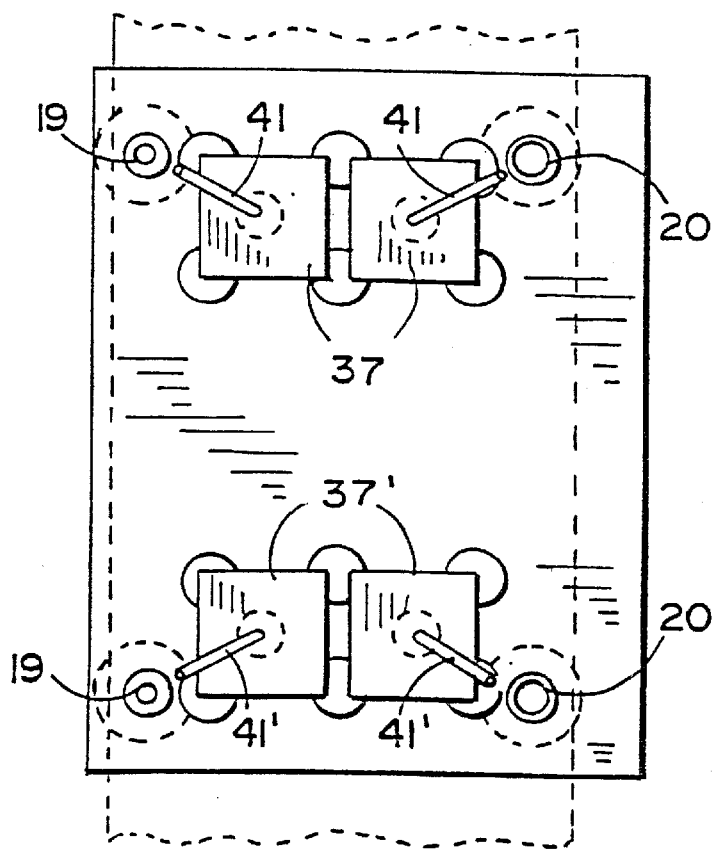
FIG. 5 is a top plan view of a representative hot staking assembly.

A single hot staking assembly can be used with different sized studs and, for this purpose, different combinations of staking tools can be used. Referring to FIG. 5, staking tools 19 are one size while staking tools 20 are substantially larger to handle larger studs. Various combinations of heaters can also be used and, in FIG. 5 the manifolds 37 are of the same size and have the same size vent tubes 41. Manifolds 37' are slightly smaller than manifolds 37 and have smaller vent tubes 41'.

It is important to note that the hot staking assembly can be assembled from various size components using different air heater and staking tools to meet any job requirement. The plates 11 and 13 can also be in any configuration to meet the particular job requirements. The assembly is connected using flexible tubing so that the assembly in one piece, or in several pieces, can be moved to various machine frames to perform hot staking operations without having to substantially alter the frame of the machine.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

What is claimed is:

1. A method of hot staking workpieces with a hot staking apparatus, the hot staking apparatus having spaced apart support plates defining a plenum, a plurality of air heaters for heating a pattern of thermally softenable and pressure deformable studs on each of the workpieces, a plurality of corresponding reciprocatable tools for forming the studs after heating, and a fan, the plurality of air heaters and the plurality of tools being supported between the support plates and the fan being positioned along a side of the plenum for urging air through the plenum, comprising steps of:

positioning a selected workpiece on the hot staking apparatus;

hot staking the studs on the selected workpiece by heating the studs with the plurality of air heaters and subsequently forming the studs with the plurality of reciprocatable tools;

removing the selected workpiece from the hot staking apparatus;

repeating the steps of positioning, hot staking and removing as desired with other selected workpieces; and continuously cooling the plurality of reciprocatable tools with a stream of forced cooling air urged through the plenum by the fan.

2. The method defined in claim 1, wherein the step of hot staking includes hot staking first and second groups of the studs by heating the first group of studs with an optimal but minimal first volume of hot air of timed duration, and by heating the second group of studs with an optimal but minimal second volume of hot air of timed duration, the first and second volumes of hot air being different in their time period of application.

3. The method defined in claim 1, wherein the hot staking apparatus includes first valves for controlling air flow through the plurality of air heaters, second valves for controlling the actuation of the tools, and an adjustable controller operably connected to the first and second valves, and wherein the steps of hot staking and forming the studs includes flowing hot air through the air heaters for a controlled time period, actuating the reciprocatable tools immediately after an end of the time period, and adjusting the controller to optimally control the length of the time period and the timing of the tool actuation.

4. The method defined in claim 1, wherein the step of adjusting the controller includes adjusting settings on the controller to predetermined settings based on the thermal energy required to adequately soften the studs.

* * * * *

UNITED STATES PATENT AND TRADEMARK OFFICE
CERTIFICATE OF CORRECTION

PATENT NO. : 6,093,277
DATED : July 25, 2000
INVENTOR(S) : Assink et al.

It is certified that error appears in the above-identified patent and that said Letters Patent is hereby corrected as shown below:

<u>Column 2,</u>
Line 11: "removable" should be -- movable --.

<u>Column 3,</u>
Line 42: "Halland" should be -- Holland --.

<u>Column 4,</u>
Line 3: "config- uration" should be -- configuration --.

<u>Column 6, claim 4,</u>
Line 45: "claim 1" should be -- claim 3 --.

Signed and Sealed this

Eleventh Day of September, 2001

Attest:

NICHOLAS P. GODICI
*Attesting Officer*  *Acting Director of the United States Patent and Trademark Office*